United States Patent
Ramaswamy et al.

(10) Patent No.: US 9,106,347 B2
(45) Date of Patent: Aug. 11, 2015

(54) DIGITAL DATA INSERTION APPARATUS AND METHODS FOR USE WITH COMPRESSED AUDIO/VIDEO DATA

(75) Inventors: Arun Ramaswamy, Tampa, FL (US); Venugopal Srinivasan, Palm Harbor, FL (US)

(73) Assignee: THE NIELSEN COMPANY (US), LLC, Schaumburg, IL (US)

(*) Notice: Subject to any disclaimer, the term of this patent is extended or adjusted under 35 U.S.C. 154(b) by 1332 days.

(21) Appl. No.: 11/237,251

(22) Filed: Sep. 8, 2005

(65) Prior Publication Data
US 2006/0171474 A1 Aug. 3, 2006

Related U.S. Application Data

(63) Continuation of application No. PCT/US03/28037, filed on Sep. 8, 2003.

(60) Provisional application No. 60/420,683, filed on Oct. 23, 2002.

(51) Int. Cl.
| | |
|---|---|
| *H04N 7/12* | (2006.01) |
| *H04N 11/02* | (2006.01) |
| *H04N 11/04* | (2006.01) |
| *H04H 20/28* | (2008.01) |
| *H04H 20/33* | (2008.01) |
| *H04H 60/37* | (2008.01) |
| *H04N 7/173* | (2011.01) |

(Continued)

(52) U.S. Cl.
CPC .............. *H04H 20/28* (2013.01); *H04H 20/33* (2013.01); *H04H 60/37* (2013.01); *H04N 7/173* (2013.01); *H04N 21/235* (2013.01); *H04N 21/236* (2013.01); *H04N 21/435* (2013.01); *H04N 21/44222* (2013.01); *H04N 21/6582* (2013.01); *H04H 20/14* (2013.01); *H04H 20/95* (2013.01); *H04H 60/43* (2013.01); *H04H 60/73* (2013.01)

(58) Field of Classification Search
CPC .............. H04N 21/235; H04N 21/435; H04N 21/23614; H04N 21/2362; H04N 19/48
See application file for complete search history.

(56) References Cited

U.S. PATENT DOCUMENTS

| | | |
|---|---|---|
| 4,367,488 A | 1/1983 | Leventer et al. |
| 4,379,947 A | 4/1983 | Warner |

(Continued)

FOREIGN PATENT DOCUMENTS

| | | |
|---|---|---|
| AU | 2004201423 | 4/2004 |
| EP | 0986047 | 3/2000 |

(Continued)

OTHER PUBLICATIONS

Patent Cooperation Treaty, International Preliminary Examination Report for PCT/US03/28037, Mar. 15, 2007, 4 pages.

(Continued)

*Primary Examiner* — Nhon Diep
(74) *Attorney, Agent, or Firm* — Hanley, Flight & Zimmerman, LLC

(57) ABSTRACT

Methods and apparatus for inserting data a compressed data bitstream are disclosed. The methods and apparatus time shift first data in a first portion of the compressed data bitstream to increase a size of a second portion of the compressed data bitstream and insert second data in the second portion of the compressed data bitstream to form a modified compressed data bitstream.

33 Claims, 10 Drawing Sheets

(51) Int. Cl.
*H04N 21/235* (2011.01)
*H04N 21/236* (2011.01)
*H04N 21/435* (2011.01)
*H04N 21/442* (2011.01)
*H04N 21/658* (2011.01)
H04H 20/14 (2008.01)
H04H 20/95 (2008.01)
H04H 60/43 (2008.01)
H04H 60/73 (2008.01)

(56) References Cited

U.S. PATENT DOCUMENTS

| | | | |
|---|---|---|---|
| 4,706,476 A | 11/1987 | Memminger et al. |
| 4,939,515 A | 7/1990 | Adelson |
| 4,943,973 A | 7/1990 | Werner |
| 4,963,998 A | 10/1990 | Maufe |
| 4,969,041 A | 11/1990 | O'Grady et al. |
| 5,019,899 A | 5/1991 | Boles et al. |
| 5,079,648 A | 1/1992 | Maufe |
| 5,319,453 A | 6/1994 | Copriviza et al. |
| 5,319,735 A | 6/1994 | Preuss et al. |
| 5,379,345 A | 1/1995 | Greenberg |
| 5,404,377 A | 4/1995 | Moses |
| 5,425,100 A | 6/1995 | Thomas et al. |
| 5,432,558 A | 7/1995 | Kim |
| 5,450,490 A | 9/1995 | Jensen et al. |
| 5,455,630 A | 10/1995 | McFarland et al. |
| 5,463,423 A | 10/1995 | Tults |
| 5,473,631 A | 12/1995 | Moses |
| 5,481,294 A | 1/1996 | Thomas et al. |
| 5,481,370 A | 1/1996 | Kim |
| 5,504,518 A | 4/1996 | Ellis et al. |
| 5,512,933 A | 4/1996 | Wheatley et al. |
| 5,526,427 A | 6/1996 | Thomas et al. |
| 5,532,732 A | 7/1996 | Yuen |
| 5,574,962 A | 11/1996 | Fardeau et al. |
| 5,581,800 A | 12/1996 | Fardeau et al. |
| 5,612,943 A | 3/1997 | Moses et al. |
| 5,629,739 A | 5/1997 | Dougherty |
| 5,650,825 A | 7/1997 | Naimpally et al. |
| 5,652,615 A | 7/1997 | Bryant et al. |
| 5,719,634 A | 2/1998 | Keery et al. |
| 5,764,763 A | 6/1998 | Jensen et al. |
| 5,768,426 A | 6/1998 | Rhoads |
| 5,774,452 A | 6/1998 | Wolosewicz |
| 5,787,334 A | 7/1998 | Fardeau et al. |
| 5,822,360 A | 10/1998 | Lee et al. |
| 5,823,164 A | 10/1998 | Seki et al. |
| 5,825,976 A | 10/1998 | Dorward et al. |
| 5,848,155 A | 12/1998 | Cox |
| 5,850,249 A | 12/1998 | Massetti et al. |
| 5,915,027 A | 6/1999 | Cox et al. |
| 5,930,369 A | 7/1999 | Cox et al. |
| 5,940,135 A | 8/1999 | Petrovic et al. |
| 5,966,120 A | 10/1999 | Arazi et al. |
| 5,974,299 A | 10/1999 | Massetti |
| 6,035,177 A | 3/2000 | Moses et al. |
| 6,061,793 A | 5/2000 | Tewfik et al. |
| 6,064,748 A | 5/2000 | Hogan |
| 6,069,914 A | 5/2000 | Cox |
| 6,081,783 A | 6/2000 | Divine et al. |
| 6,128,736 A | 10/2000 | Miller |
| 6,151,578 A | 11/2000 | Bourcet et al. |
| 6,154,484 A | 11/2000 | Lee et al. |
| 6,154,571 A | 11/2000 | Cox et al. |
| 6,175,639 B1 | 1/2001 | Satoh et al. |
| 6,192,427 B1 | 2/2001 | Li et al. |
| 6,202,210 B1 | 3/2001 | Ludtke |
| 6,208,735 B1 | 3/2001 | Cox et al. |
| 6,215,526 B1 | 4/2001 | Barton et al. |
| 6,219,634 B1 | 4/2001 | Levine |
| 6,229,924 B1 | 5/2001 | Rhoads et al. |
| 6,243,481 B1 | 6/2001 | Tao |
| 6,252,631 B1 | 6/2001 | Lakhani |
| 6,259,801 B1 | 7/2001 | Wakasu |
| 6,263,087 B1 | 7/2001 | Miller |
| 6,266,096 B1 | 7/2001 | Gutsmann et al. |
| 6,268,866 B1 | 7/2001 | Shibata |
| 6,272,176 B1 | 8/2001 | Srinivasan |
| 6,278,792 B1 | 8/2001 | Cox et al. |
| 6,289,514 B1 | 9/2001 | Link et al. |
| 6,298,142 B1 | 10/2001 | Nakano et al. |
| 6,307,950 B1 | 10/2001 | Powell et al. |
| 6,332,194 B1 | 12/2001 | Bloom et al. |
| 6,338,037 B1 | 1/2002 | Todd et al. |
| 6,353,929 B1 | 3/2002 | Houston |
| 6,359,573 B1 | 3/2002 | Taruguchi et al. |
| 6,373,960 B1 | 4/2002 | Conover et al. |
| 6,400,827 B1 | 6/2002 | Rhoads |
| 6,415,041 B1 | 7/2002 | Oami et al. |
| 6,421,445 B1 | 7/2002 | Jensen et al. |
| 6,424,726 B2 | 7/2002 | Nakano et al. |
| 6,438,252 B2 | 8/2002 | Miller |
| 6,453,053 B1 | 9/2002 | Wakasu |
| 6,456,724 B1 | 9/2002 | Watanabe |
| 6,467,089 B1 | 10/2002 | Aust et al. |
| 6,470,090 B2 | 10/2002 | Oami et al. |
| 6,477,707 B1 | 11/2002 | King et al. |
| 6,493,457 B1 | 12/2002 | Quackenbush et al. |
| 6,505,223 B1 | 1/2003 | Haitsman et al. |
| 6,507,299 B1 | 1/2003 | Nuijten |
| 6,510,233 B1 | 1/2003 | Nakano |
| 6,512,796 B1 | 1/2003 | Sherwood |
| 6,513,161 B2 | 1/2003 | Wheeler et al. |
| 6,519,769 B1 | 2/2003 | Hopple et al. |
| 6,523,175 B1 | 2/2003 | Chan |
| 6,530,082 B1 | 3/2003 | Del Sesto et al. |
| 6,539,095 B1 | 3/2003 | Rhoads |
| 6,553,070 B2 | 4/2003 | Hashimoto |
| 6,567,780 B2 | 5/2003 | Rhoads |
| 6,574,350 B1 | 6/2003 | Rhoads et al. |
| 6,574,594 B2 | 6/2003 | Pitman et al. |
| 6,584,138 B1 | 6/2003 | Neubauer et al. |
| 6,611,607 B1 | 8/2003 | Davis et al. |
| 6,647,129 B2 | 11/2003 | Rhoads |
| 6,664,976 B2 | 12/2003 | Lofgren et al. |
| 6,665,419 B1 | 12/2003 | Oami |
| 6,668,068 B2 | 12/2003 | Hashimoto |
| 6,678,392 B2 | 1/2004 | Powell et al. |
| 6,697,499 B2 | 2/2004 | Oami |
| 6,700,993 B1 | 3/2004 | Minematsu |
| 6,724,911 B1 | 4/2004 | Cox et al. |
| 6,725,412 B1 | 4/2004 | Smithers et al. |
| 6,735,325 B2 | 5/2004 | Wakasu |
| 6,738,493 B1 | 5/2004 | Cox et al. |
| 6,738,744 B2 | 5/2004 | Kirovski et al. |
| 6,785,399 B2 | 8/2004 | Fujihara |
| 6,798,893 B1 | 9/2004 | Tanaka |
| 6,807,528 B1 * | 10/2004 | Truman et al. ............... 704/229 |
| 6,826,289 B1 | 11/2004 | Hashimoto |
| 6,834,345 B2 | 12/2004 | Bloom et al. |
| 6,853,737 B2 | 2/2005 | Watanabe |
| 6,856,693 B2 | 2/2005 | Miller |
| 6,915,000 B1 | 7/2005 | Tanaka |
| 6,928,165 B1 | 8/2005 | Takai |
| 6,947,562 B2 | 9/2005 | Hashimoto |
| 6,947,572 B2 | 9/2005 | Terasaki |
| 6,968,564 B1 | 11/2005 | Srinivasan |
| 6,996,249 B2 | 2/2006 | Miller et al. |
| 7,007,167 B2 | 2/2006 | Kurahashi |
| 7,027,611 B2 | 4/2006 | Hashimoto |
| 7,050,604 B2 | 5/2006 | Fujihara et al. |
| 7,051,207 B2 | 5/2006 | Watanabe |
| 7,092,546 B2 | 8/2006 | Tanaka |
| 7,114,073 B2 | 9/2006 | Watanabe |
| 7,134,133 B1 * | 11/2006 | Wugofski ............... 725/39 |
| 7,146,501 B2 | 12/2006 | Tanaka |
| 7,149,324 B2 | 12/2006 | Tanaka |
| 7,159,117 B2 | 1/2007 | Tanaka |
| 7,587,601 B2 * | 9/2009 | Levy et al. ............... 713/176 |
| 2001/0026616 A1 | 10/2001 | Tanaka |
| 2001/0031064 A1 | 10/2001 | Donescu |
| 2001/0047478 A1 | 11/2001 | Mase |

(56) References Cited

U.S. PATENT DOCUMENTS

| | | | |
|---|---|---|---|
| 2001/0053235 | A1 | 12/2001 | Sato |
| 2001/0053237 | A1 | 12/2001 | Hashimoto |
| 2002/0006203 | A1 | 1/2002 | Tachibana |
| 2002/0010919 | A1 | 1/2002 | Lu et al. |
| 2002/0026635 | A1 | 2/2002 | Wheeler et al. |
| 2002/0059632 | A1 | 5/2002 | Link et al. |
| 2002/0085736 | A1 | 7/2002 | Kalker |
| 2002/0085737 | A1 | 7/2002 | Kitamura |
| 2002/0097891 | A1 | 7/2002 | Hinishi |
| 2002/0106106 | A1 | 8/2002 | Sato |
| 2002/0129253 | A1 | 9/2002 | Langelaar |
| 2002/0147990 | A1 | 10/2002 | Lu et al. |
| 2002/0162118 | A1* | 10/2002 | Levy et al. ............... 725/110 |
| 2002/0178410 | A1 | 11/2002 | Haitsma et al. |
| 2003/0081781 | A1 | 5/2003 | Jensen et al. |
| 2003/0131350 | A1 | 7/2003 | Peiffer et al. |
| 2003/0133590 | A1 | 7/2003 | Miller et al. |
| 2004/0059918 | A1* | 3/2004 | Xu ............................ 713/176 |
| 2007/0040934 | A1 | 2/2007 | Ramaswamy et al. |

FOREIGN PATENT DOCUMENTS

| | | |
|---|---|---|
| GB | 2 063 018 | 10/1981 |
| GB | 2 196 167 | 4/1988 |
| WO | 9933206 | 7/1999 |
| WO | 99/63443 | 12/1999 |
| WO | 01/61892 | 8/2001 |
| WO | 0215410 | 2/2002 |
| WO | 02/49363 | 6/2002 |
| WO | 02/091361 | 11/2002 |
| WO | 2004038538 | 5/2004 |
| WO | 2005002200 | 1/2005 |
| WO | 2005008582 | 1/2005 |
| WO | 2005099385 | 10/2005 |

OTHER PUBLICATIONS

Chinese language and English translation of "Notice of Completion of Formalities for Patent Registration," issued by the State Intellectual Property Office of China on Aug. 1, 2008, 5 pages.

Office Action, issued by the Mexicano la Propiedad Industrial on Feb. 5, 2009, 2 pages.

Patent Examination Report No. 1, issued by the Australian Government in connection with Australian Patent Application No. 2011201930, on Aug. 28, 2012, 3 pages.

Watson, "Signaling Techniques for Broadcasting Application," Audio Engineering Society, Convention Papers 5628, May 10-13, 2008, 7 pages.

"Digital Audio Compression Standard(AC-3)," Advanced Television Systems Committee, Dec. 20, 1995, pp. 1-65.

"Digital Audio Compression Standard(AC-3)," Advanced Television Systems Committee, Dec. 20, 1995, pp. 1-128.

Office Action, issued by the Canadian Intellectual Property Office in connection with Canadian Patent Application No. 2,503,340, on Apr. 11, 2013, 5 pages.

Decision to Refuse European Patent application, issued by the European Patent Office, in connection with European Patent Application No. 03749497.8-1247, on Apr. 12, 2012, 14 pages.

Canadian Intellectual Property Office, "Office Action," issued in connection with corresponding Canadian Patent Application No. 2,503,340, mailed Jul. 9, 2014 (5 pages).

Canadian Office Action, issued by the Canadian Intellectual Property Office on Jul. 16, 2010, in connection with Canadian Patent Application No. 2,503,340, 3 pages.

"Notice of Preliminary Rejection," issued by the Korean Intellectual Property Office, in connection with Korean Application No. 10-2005-7007036, on Sep. 30, 2010, 2 pages.

Office action issued by the European Patent Office in connection with European Patent Application No. 03749497.8-1247, on Nov. 3, 2011, 7 pages.

Supplementary European Search Report, issued by the European Patent Office in connection with European Application No. 0374947. 8, on Dec. 11, 2010, 3 pages.

Watson et al., "Signaling Techniques for Broadcasting Applications," Audio Engineering Society, Convention Paper 5628, May 10-12, 2002, 7 pages.

"Digital Audio Compression Standard (AC-3)," issued by the Advanced Television Systems Committee, Dec. 20, 1995, 1-65 pages.

"Digital Audio Compression Standard (AC-3)," issued by the Advanced Television Systems Committee, Dec. 20, 1995, 66-138 pages.

European Office Action, issued by the European Patent Office in connection with European Application No. 03-749497.8-1247, on Mar. 24, 2011., 7 pages.

Advanced Television Systems Committee, "All About PSIP: Roadmap to the DTV Program and System Information Protocol," www.psip.org, Apr. 20, 2003, 4 pages.

Allison, Arthur W., "PSIP 101: What You Need to Know," Broadcast Engineering, Jun. 2001, 3 pages.

Citeseer.ist, "Content-Based Digital Watermarking for Compressed Audio (2000)", 1995-2000, Citeseer.ist.psu.edu, 1 page.

"Digital Audio Watermarking," Audio Media, Jan./Feb. 1998. pp. 56, 57, 59, and 61.

Fraunhofer Iis, "Audio & Multimedia Watermarking", http://www.iis.fraunhofer.de/amm/techinf/water/, 1998-2006, 7 pages.

Heredia, Edwin A., "PSIP: The Digital Television Protocol for System Information and Program Guide," Thompson Multimedia, Indianapolis, IN, 7 pages.

Herre, Juergen, "Audio Watermarking in the Bitstream Domain", IEEE, Jun. 12-13, 2000, 23 pages.

Patent Cooperation Treaty, International Search Report for PCT/US2002/03705, Sep. 11, 2002, 2 pages.

Patent Cooperation Treaty, International Search Report for PCT/US2003/28037, Feb. 28, 2005, 3 pages.

Patent Cooperation Treaty, Written Opinion for PCT/US2003/28037, Oct. 12, 2006, 4 pages.

The Arbitron Company, Arbitron Patent Specification ZA 92-7317; Method and Apparatus for Automatically Identifying a Program Including Sound Signal, 30 pages.

Watson, Matthew A. and Buettner, Peter, "Design and Implementation of AAC Decoders," THPM 20.6, 2000, Dolby Laboratories, Inc., San Francisco, CA, 2 pages.

Xu, Changsheng; Wu, Jiankang; and Feng, David Dagan, "Content-Based Digital Watermarking for Compressed Audio," Kent Ridge Digital Labs and the University of Sydney, Singapore and Sydney, Australia, 13 pages.

* cited by examiner

DIGITAL DATA INSERTION APPARATUS AND METHODS FOR USE WITH COMPRESSED AUDIO/VIDEO DATA

RELATED APPLICATION

This patent issues from a continuation application which claims priority from International Patent Application Serial No. PCT/US2003/028037, which was filed on Sep. 8, 2003 and which is hereby incorporated by reference in its entirety. International Patent Application Serial No. PCT/US2003/028037 claims priority from U.S. Provisional Application Ser. No. 60/420,683, which was filed on Oct. 23, 2002.

FIELD OF THE DISCLOSURE

The present disclosure relates generally to the delivery and distribution of compressed digital audio/video content such as digital broadcast systems and, more specifically, to digital data insertion apparatus and methods for use with compressed audio/video data.

BACKGROUND

Digital broadcast systems have undergone rapid development and deployment in recent years due, at least in part, to their ability to efficiently distribute large numbers of high-fidelity video and/or audio programs, as well as other digital services or programs, over a large geographic region. For example, in the case of satellite-based digital television and audio broadcast systems, little, if any, land-based infrastructure (e.g., ground stations, cable lines, etc.) is needed to provide services to subscribers on a world-wide basis. As a result, such satellite-based systems enable digital broadcasters and content providers to develop markets for their programs and/or services in remote and/or underdeveloped regions of the world in a cost-effective manner.

In general, regardless of whether a digital broadcast system uses one or more satellites, cable transmission lines, ground-based wireless transmission stations, or any combination thereof, such a system enables users to receive high-fidelity video and/or audio programs, as well as user-interactive features or tools such as, for example, pictographic program guides, grid-based guides, etc. that enable users to plan and carry out program consumption activities. Digital broadcast systems typically transmit one or more high-bandwidth signals, each of which is typically composed of a stream of data or data packets having a plurality of video, audio and/or other digital programs or content multiplexed therein. A number of well-known data compression techniques (e.g., audio/video content compression techniques), transmission protocols and the like are typically employed to generate and transmit a multi-program data stream or bitstream, which is commonly referred to as a transport stream. In particular, digital television programming is typically transmitted according to a standard promulgated by the Advanced Television Standards Committee (ATSC). The ATSC standard is a comprehensive standard relating to the conveyance of digital television signals. Under the ATSC standard, video information associated with a program is encoded and compressed according to the well-known Moving Pictures Expert Group-2 (MPEG-2) standard and audio information associated with the program is encoded and compressed according to the well-known AC-3 standard. As a result, an ATSC data stream or bit stream contains video information in the form of MPEG-2 packets and audio information in the form of AC-3 packets. However, other digital transmission protocols, data compression schemes and the like may be used instead.

In the case of freely available digital audio/video content or programming, users must have a television adapted to receive and process digital television signals (e.g., a high definition television). In the case of purchased digital audio/video content or programming, subscribers typically have a digital decoder unit which, in the case of a digital video or television system, is commonly referred to as a "set-top box," that receives and processes multi-program data streams or transport streams and outputs video and audio signals to a television, video monitor, speakers, etc. for consumption by the user. In particular, the set-top box can, based on subscriber commands, extract data packets associated with a particular program or portion of audio/video content from a particular data stream or transport stream, decode those extracted data packets and send video and/or audio signals to a television, video monitor, digital radio, etc. for consumption by a user.

As is the case with analog content providers and broadcasters, digital content providers and broadcasters (e.g., digital television broadcasters, digital audio broadcasters, etc.) often desire to verify the transmission and/or to meter (i.e., monitor) the consumption of the audio/video content or programs and/or other services provided to subscribers. In this manner, a broadcaster can generate broadcast verification information and/or audience program consumption behavior or patterns. Audience consumption behavior or patterns may be used in conjunction with demographic information to develop ratings information, to improve targeted marketing or advertising campaigns, to improve the types of programs or audio/video content and/or services and the times at which those programs and/or services are delivered to consumers, to assess the value of a particular time slot and program for purposes of determining what advertisers should pay for usage of that time slot, etc.

With known analog television metering systems, viewing records or other viewing information is typically collected from a group of statistically selected households. As with digital broadcast systems, each of the statistically selected households has a data logging and processing unit (i.e., "home unit" or "site unit"). The site unit is usually coupled to a variety of attachments that provide inputs to the site unit or that receive outputs from the site unit. For example, an analog system may include a frequency detector to detect the local oscillator frequency of a television to identify the channel to which the television is currently tuned. Also, for example, a people counter, may be located in the viewing space of the television and may be in communication with the site unit, thereby enabling the site unit to actively or passively detect the identities of the persons currently viewing programs presented by the television.

The site unit usually processes its inputs, including the inputs from its attachments, to produce viewing records. The viewing records typically contain audio/video content or program identification information (i.e., information that can be used to identify a particular program or portion of audio/video content, such as channel information obtained from the frequency detector) and audience information. The audience information may include the numbers and/or identities of persons viewing a particular program, demographic information, etc. The viewing records may be generated on a periodic basis (i.e., at fixed time intervals) or may be generated in response to a change in an input such as, for example, a change in the identities or number of persons viewing the television, a change in the channel tuning information (i.e., a channel change), etc. With known analog systems, each viewing record typically contains channel information such as a station or channel number and a time (e.g., a date and time of day) at which the channel was viewed. Of course, viewing records may contain other information such as the identities of viewers present at the viewing time.

The site unit collects a quantity of viewing records and transmits collected viewing records, usually daily, to a collection site, such as central office or data processing facility, for further processing or analysis. The data processing facility receives viewing records from site units located in some or all of the statistically selected households and analyzes the viewing records to ascertain the viewing behaviors of a particular household or a particular group of households selected from all participating households. Additionally, the central data processing facility may generate viewing behavior statistics and other parameters indicative of viewing behavior associated with all of the participating households.

To generate viewing behavior information from viewing records, the central office or data processing facility compares reference data such as a list of programs (i.e., a schedule of television programming or program lineup) to the viewing records. In this manner, the data processing facility can determine which programs were viewed by matching the times and channel information in the viewing records to the programs associated with those same times and channels in the program schedule or lineup. Such a matching process can be carried out for each of the viewing records received by the data processing facility, thereby enabling the data processing facility to reconstruct what programs were watched by all participating households and the times at which the programs were watched.

However, known analog program metering systems (such as the television program verification and metering systems discussed above) are not suitable for use with digital broadcast systems. For example, the frequency detector attachment described above is not suitable for detecting digital video channel information because digital television systems use a data packet extraction process within a set-top box to retrieve audio/video data associated with a particular program, while the television tuner is typically allowed to remain on a single channel (e.g., typically channel 2 or 3). As a result, the local oscillator frequency of the television tuner is not indicative of (i.e., does not necessarily correspond to) the digital television channel currently being consumed. Thus, known analog program metering systems are not suitable for use with digital broadcast systems. More generally, known analog program metering systems cannot be used to detect the identity of broadcast digital programs, thereby preventing analog monitoring systems from being used to generate verification information and/or viewing records that can be processed to determine digital program consumption behavior.

To enable the tracking of viewing records, some digital broadcasters enable the identification of digital broadcast programs at home sites and one or more reference sites by inserting digital program identification information and/or other data in the video and/or audio bitstream(s). The inserted digital data is commonly referred to as audience measurement data, which may include signal identification codes (i.e., digital codes that are uniquely associated with respective audio/video content portions or programs), date information, time information, consumer identification information, etc. The insertion of audience measurement data at the distribution system headend or broadcast station is commonly referred to as an active audio/video content identification process because the system headend or broadcast station actively modifies (i.e., inserts data into) the transmitted bitstreams or transport streams.

By actively inserting data into audio/video bitstreams in this manner, digital broadcasters enable the identification of digital audio/video content and the viewing behavior of persons viewing digital broadcasts to be readily determined. In particular, the site units associated with individual homes sites may be configured to extract the inserted audio/video content identification codes from known portions or locations within a received bitstream and to use the extracted information to form, for example, viewing records. In turn, viewing records may be further analyzed at each of the home sites and/or at one or more collection or central processing sites to generate viewing behavior information, ratings data, etc.

Typically, known active data insertion techniques insert digital data within each of the video and/or audio signals that make up the one or more programs (i.e., video and/or audio programs) being transmitted by the broadcast station before the individual video and/or audio signals are compressed and multiplexed to form a single multi-program bitstream or transport stream. However, because the digital data are inserted in an uncompressed domain (i.e., within the individual uncompressed audio/video signals), multiple digital data insertion devices (e.g., one for each uncompressed program bitstream) are typically required. This requirement for multiple digital information insertion devices is undesirable because it increases the complexity and operational costs associated with headend or broadcast stations.

Another difficulty that results from inserting digital data into individual uncompressed program signals is that subsequent compression operations (e.g., compression encoding) may corrupt and/or eliminate some or all of the inserted data. As is known, signal compression techniques usually provide a substantial reduction in the quantity of data needed to reproduce a video image and/or an audio signal, but do so at the expense (i.e., the loss) of at least some data or information. Thus, if compression operations corrupt the inserted digital data, the home site and/or a central data processing or collection facility may not be able to accurately identify audio/video content.

Still another difficulty that results from inserting digital codes or audience measurement data into individual uncompressed audio/video content signals is that the association between the inserted data or information and the program into which the data is inserted is limited. In particular, the inserted data may be associated with only the video portion of a program or only the audio portion of that same program, but not both the video and audio portions. This lack of association is further complicated by the fact that a digital broadcast station may redefine the position (e.g., the sub-channel or minor channel number) of an uncompressed video and/or audio program within the compressed domain, or may delete one or more video and/or audio programs from a program lineup.

DETAILED DESCRIPTION

Figure 1:
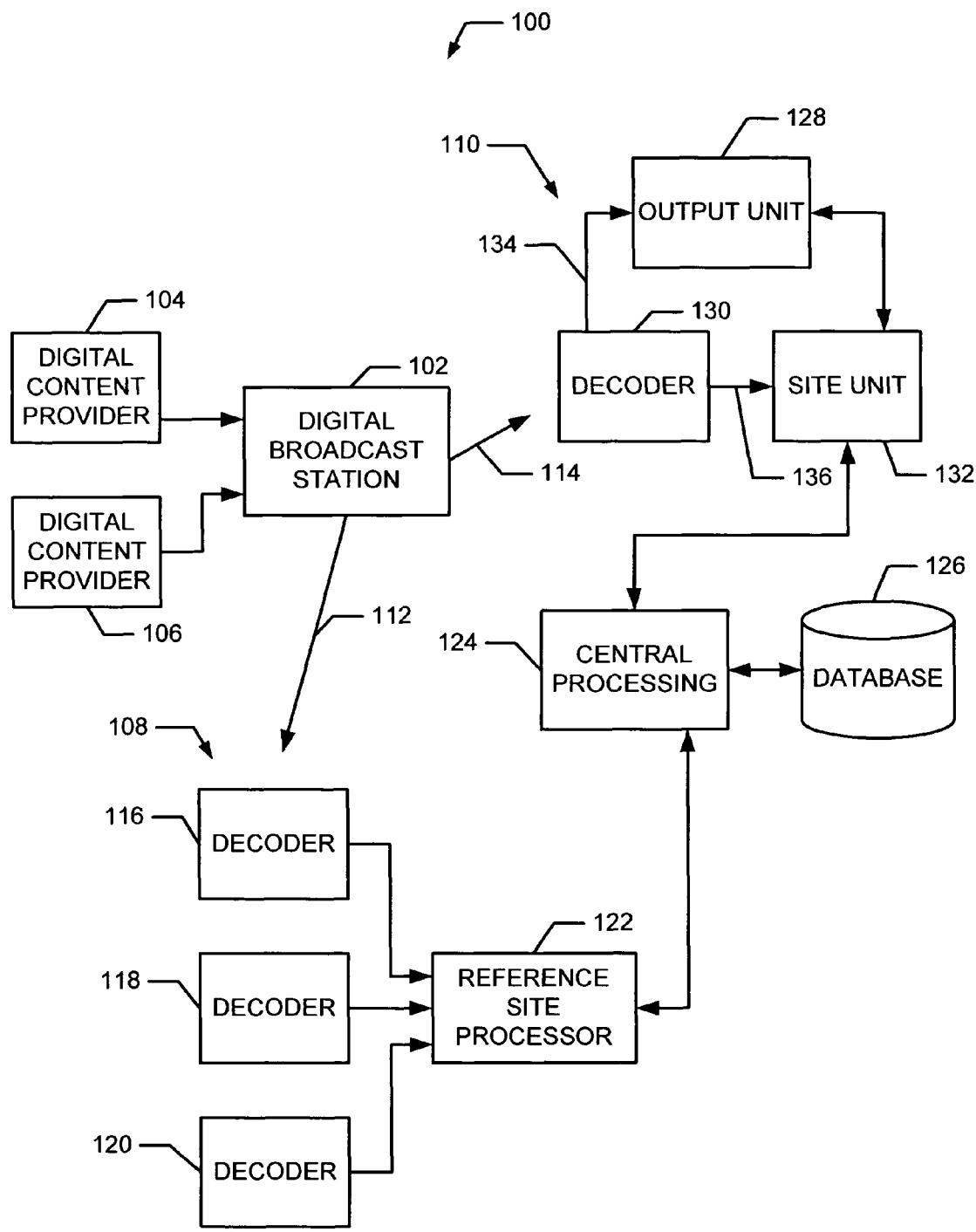
FIG. 1 is a block diagram of an example system within which the data insertion apparatus and methods described herein may be used to identify digital audio/video content or programs and to generate verification information and/or viewing behavior information based on the identified audio/video content or programs.

FIG. 1 is a block diagram of an example system 100 within which the data insertion apparatus and methods described in greater detail below may be used to identify broadcast digital audio/video content or programs and to generate viewing behavior and ratings information based on the identified audio/video content. The system 100 includes a digital broadcast station 102 that receives digital video and/or audio content from a plurality of digital content providers 104 and 106. The digital content providers 104 and 106 may provide a variety of audio/video content such as, for example, television programs, advertisements, audio (e.g., radio) programs, still image information (e.g., web pages), etc. in known manners to the digital broadcast station 102. The digital broadcast station 102 transmits one or more signals containing digital audio/video content to a reference site 108 and at least one consumption site 110 via communication paths or links 112 and 114. The communication paths or links 112 and 114 may include any combination of hardwired or wireless links such as, for example, satellite links, wireless land-based links, cable links, etc. The signals conveyed via the links 112 and 114 may contain multi-program data streams or bitstreams, which are often referred to as transport streams and commonly employed with existing digital television transmission systems.

The reference site 108 and the consumption site 110 receive and process the digital signals or digital audio/video content provided by the digital broadcast station 102 using the audio/video content identification apparatus and methods described herein. More specifically, the reference site 108 includes a plurality of decoders (e.g., set-top boxes or the like) 116, 118 and 120 that demodulate, demultiplex and decode audio, video and/or other data packets received from the digital broadcast station 102. In one example, each of the decoders 116, 118 and 120 provides audio and/or video data packets associated with a different program, which is currently being broadcast, to a reference site processor 122. In other words, the decoder 116 may provide data packets associated with a first program while the decoders 118 and 120 provide data packets associated with respective second and third programs. The reference site processor 122 is configured to control and/or has information indicating to which channel, sub-channel, etc. each of the decoders 116, 118 and 120 is currently tuned.

The reference site processor 122 may include apparatus and methods for extracting the data inserted by the digital broadcast station 102 into the broadcast audio/video content (e.g., one or more transport streams). In particular, the reference site processor 122 may be configured to extract digital codes and/or other data or information inserted by the digital broadcast station 102 from known locations within data packets and/or data frames using the data insertion apparatus and methods disclosed herein. The reference site processor 122 may send the extracted codes and/or other digital information to a central processing unit 124 that, in turn, may process the extracted codes and/or other digital information to generate, for example, broadcast verification information, program lineup information, or any other desired information relating to the audio/video content broadcast by the station 102.

The consumption site 110 could be, for example, a statistically selected home or residence, a business location, a mobile device (e.g., a portable computer, cellular phone or personal data assistant, etc.) or any other site or device enabling the consumption of video and/or audio content or programs. For purposes of simplifying the discussion, FIG. 1 depicts a single system or consumption site 110. However, a plurality of consumption sites may be configured in manners similar or identical to that of the example consumption site 110.

The consumption site 110 includes an output unit 128 such as, for example, a video display, television, speaker, etc. The consumption site 110 also includes a decoder (e.g., a set-top box) 130, which may be similar or identical to the decoders 116-120. As shown in FIG. 1, the decoder 130 may be serially interposed between the broadcast signal 114 and the output unit 128 and provides audio and/or video signals 134 to the output unit 128 that are used to present the program currently selected for consumption. For example, in the case where the broadcast signal 114 is a digital satellite or cable television transmission, the decoder 130 demodulates extracts video and/or audio data packets associated with a desired channel and/or program. The extracted data packets are processed to form the signal 134 that can be presented (e.g., displayed) by the output unit 128. For example, in the case where the output unit 128 is a television, the signal 134 may be a composite video signal, a super-video signal, a red, green, blue (RGB) signal, or any other displayable video signal applied to the appropriate input connections of the output unit 128.

In addition, the decoder 130 also provides signals 136 containing digital audio/video content data to the site unit 132. The audio/video content data may, for example, be digital audio signals provided using the well-known Sony Corporation and Philips Corporation Digital Interface Format (S/PDIF), or any other desired format that provides data packets associated with digital broadcasts. In that case, the audio/video content data is compressed digital audio data associated with audio/video content to which the decoder is currently tuned and which is being consumed via the output unit 128.

In addition to its signal processing functions, the decoder 130 may also perform access control functions such as, for example, determining what programs are available for consumption by a user of the system 100 based on subscription status or subscription information associated with the system 100, generating displayable program guide information, etc.

The site unit 132 processes the signals 136 received from the decoder 130 to extract the inserted data (e.g., audience measurement data) therefrom. The site unit 132 may then convey the extracted digital data (e.g., audience measurement data) to the central processing unit 124. The central processing unit 124 may process the extracted digital data to determine what audio/video content (e.g., channels and/or programs) was consumed, the times at which the audio/video content was consumed, and/or the identities of those who consumed the audio/video content. In this manner, the central processing unit 124 may generate viewing behavior information or statistics, ratings information or any other desired information relating to the consumption of audio/video content at the consumption site 110 or at one or more other consumption sites (none of which are shown).

While the output unit 128, the decoder 130 and the site unit 132 are depicted in FIG. 1 as separate blocks, the functions performed by these blocks may be combined or integrated in any desired manner. For example, in the case where the consumption site 110 is a portable device (e.g., a personal data assistant having a wireless communication interface), the functions performed by the blocks 128, 130 and 132 may be integrated within the portable device. Alternatively, the functions performed by the output unit 128 and the decoder 130 may be integrated within the portable device, which is then periodically or continuously communicatively coupled to the site unit 132 to download its extracted data to the site unit 132. In that case, the site unit 132 may be implemented as a base unit in which the portable device is periodically disposed to perform download operations.

Figure 2:
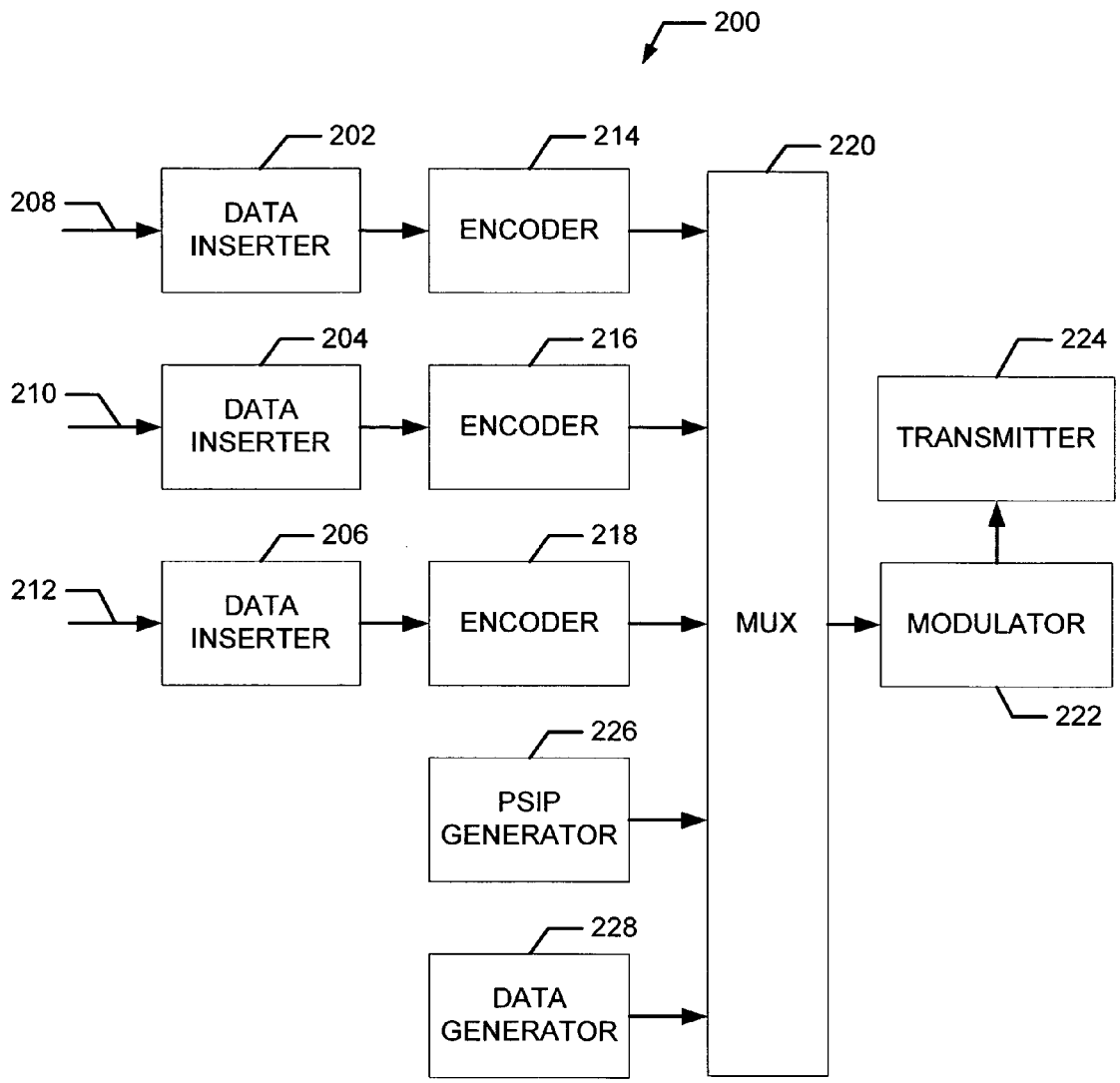
FIG. 2 is a block diagram of an example known system that may be used by the digital broadcast station of FIG. 1 to insert audience measurement data in one or more uncompressed audio/video content or program bitstreams.

FIG. 2 is a block diagram of an example known system 200 that may be used by the digital broadcast station 102 of FIG. 1 to insert audience measurement data into one or more uncompressed audio/video content or program bitstreams. The system includes a plurality of data inserters 202, 204 and 206, each of which is configured to insert data into respective uncompressed audio/video content data streams 208, 210 and 212. Each of the streams 208, 210 and 212 contains a single audio/video program, which may be provided by a digital content provider similar or identical to the digital content providers 104 and 106 shown in FIG. 1 and/or which may be provided a local source such as, for example, a digital video recorder, a video cassette recorder, or any other suitable digital media delivery devices.

The data inserters 202, 204 and 206 may be implemented using known data insertion devices such as vertical blanking inserters, watermarking encoders and closed caption encoders. The outputs of the data inserters 202, 204 and 206 are coupled to respective encoders 214, 216 and 218. The encoders 214, 216 and 218 are compression encoders that compress each of the individual audio/video content bitstreams (into which data has been inserted) using a known audio/video compression scheme such as for example, a compression scheme compliant with the AC-3 and/or MPEG standards.

The compressed audio/video content bitstreams output by the encoders 214, 216 and 218 are multiplexed to form a single bitstream or transport stream by a multiplexer 220. The multiplexer 220 may multiplex the compressed bitstreams received from the encoders 214, 216 and 218 using a multiplexing scheme compliant with, for example, the ATSC and/or Digital Video Broadcast (DVB) standards. The multiplexer 220 provides its multi-program bitstream or transport stream to a modulator 222, which modulates the transport stream using known techniques, and a transmitter 224, which uses known techniques to transmit or broadcast the transport stream via, for example, the communication links 112 and 114 shown in FIG. 1.

The system 200 may also includes a Program and System Information Protocol (PSIP) generator 226, which uses well known techniques to generate a collection of hierarchically interlinked tables that contain information relating to the location of channels and programs, program scheduling (e.g., program lineup information), information facilitating the construction of program guides, as well as unique identifiers such as transport stream identifiers (TSIDs), each of which uniquely corresponds to a broadcaster. The PSIP generator 226 provides the PSIP information to the multiplexer 220, which multiplexes the PSIP information into the transport stream.

In addition, the system 200 may include a data generator 228, which may provide interactive program information to the multiplexer 220, which multiplexes the interactive program information into the transport stream. For example, the data generator 228 may generate program information that may be used at a consumption site (e.g., the consumption site 110 shown in FIG. 1) to generate a program grid-guide and/or to provide other user interface functionality at the consumption site.

While the known system 200 of FIG. 1 enables audience measurement data to be inserted into individual audio/video program bitstreams, the inserted data may be corrupted or lost during the encoding or compression process performed by each of the encoders 214, 216 and 218. In addition, because the data inserters 202, 204 and 206 insert audience measurement data without reference to the information being generated by the PSIP generator 226, changes in program lineup (e.g., reassignment of a program by a station to a different sub-channel, removal of a program, etc.) are not considered during the data insertion process. As a result, the inserted audience measurement data extracted at a consumption site may not reflect the programs or audio/video content actually consumed. To address this issue, two sets of metadata would have to be maintained to generate ratings information. In particular, one set of metadata associated with the inserted data and another set of metadata generated by the PSIP device (e.g., station or broadcaster metadata that is used for program identification). In addition, a mapping between the two sets of metadata would be required so that ratings information could ultimately be provided in terms the metadata generated by the PSIP device. Still further, the system 200 requires a separate data inserter for each program bitstream and, thus, may become overly complex in cases where the broadcast station (e.g., the broadcast station 102 of FIG. 1) multiplexes a large number of programs to form its transport stream or if a new channel is introduced for transmission.

Figure 3:
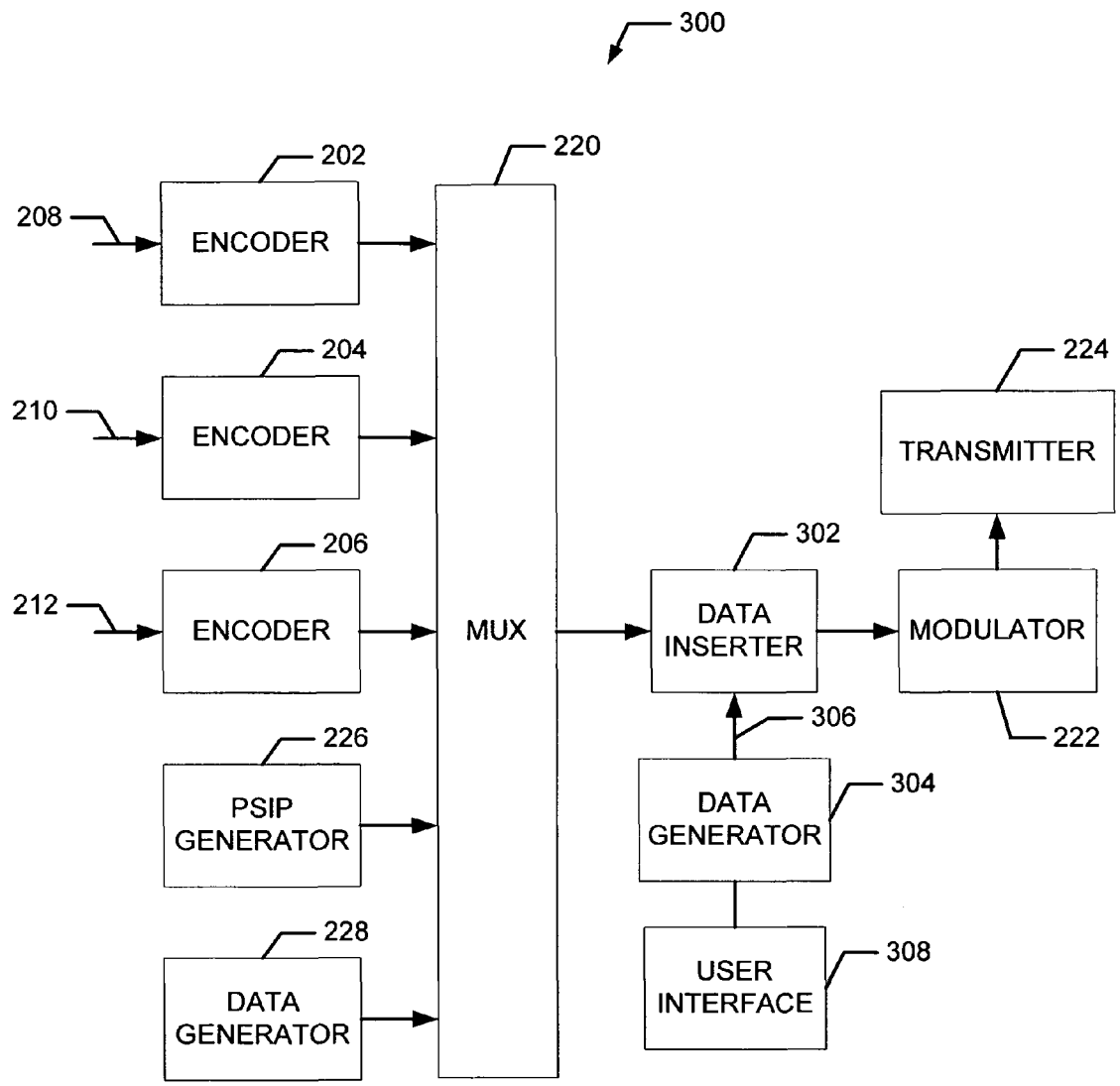
FIG. 3 is a block diagram of an example system that may be used within the digital broadcast station of FIG. 1 to insert audience measurement data in a compressed audio/video content or program bitstream.

FIG. 3 is a block diagram of an example system 300 that may be used within the digital broadcast station 102 of FIG. 1 to insert audience measurement data in a compressed audio/video content or program bitstream. Many of the functional blocks shown in the system 300 of FIG. 3 are similar or identical to those shown and described in connection with FIG. 2. However, the system 300 interposes a data inserter 302 between the multiplexer 220 and the modulator 222, thereby eliminating the need for the plurality of data inserters 202, 204 and 206 (FIG. 2). In contrast to the data inserters 202, 204 and 206, the data inserter 302 operates in a compressed domain. In particular, the data inserter 302 inserts data (e.g., audience measurement data and/or other data) in a multi-program bitstream or transport stream that contains compressed audio/video data, PSIP information generated by the PSIP generator 226 and/or other data generated by the data generator 228.

As described in greater detail below, the data inserter 302 operates on a bitstream containing frames of data packets that are formatted using a predefined compression and transmission protocol. The data inserter 302 temporally packs or time shifts data within data frames to expand (i.e., increase the size of) a predetermined data area or location within one or more of the data frames and inserts audience measurement data within the one or more expanded predetermined data areas or locations. The inserted audience measurement data may then be extracted by one or more decoders at one or more consumption sites and reference sites and used to generate consumption records, verification information, program lineup information, viewing behavior information etc.

Because the data inserter 302 operates in a compressed domain (i.e., it operates on bitstreams containing compressed data), the audience measurement data that it inserts cannot be corrupted or lost as a result of compression operations, as is the case with known systems (e.g., the known system 200 shown and described in connection with FIG. 2). In addition, because the data inserter 302 has access to the information generated by the PSIP generator 226, the data inserter 302 always inserts audience measurement data that is consistent with the program lineup information contained with the PSIP tables provided by the PSIP generator 226. In this manner, the system 300 maintains two metadata systems (i.e., the metadata produced by the PSIP device and the metadata produced as a result of the data insertion process) that contain the same information. As a result, the system 300 provides audience measurement data that is more reliable than that provided by the known system 200 of FIG. 2, particularly in cases where the broadcast station 102 (FIG. 1) makes frequent changes to its program lineup.

The system 300 may also include a data generator 304 that generates non-audience measurement data such as, for example, interactive data (e.g., uniform resource locators (URLs), Internet protocol (IP) data, etc.), private or proprietary data, or any other non-audience measurement data. In one example, the data generator 304 may generate data using the format shown below.

Time Code: XX
Minor Channel/Major Channel: XX/YY
Data: http://xx.xx.xxx

The data generator 304 may be separate from the data inserter 302 as shown in FIG. 3, in which case the data generator 304 may be communicatively coupled to the data inserter 302 via a communication link 306 such as for example, a serial interface, an Ethernet compatible link, or any other suitable communication link. Alternatively, the data generator 304 may be integral with the data inserter 302. The data generator 304 may also be coupled to a user interface 306, which may include a keyboard, monitor, mouse, etc. that enable an operator to enter data to be inserted via the data generator 304 and the data inserter 302.

Figure 4:
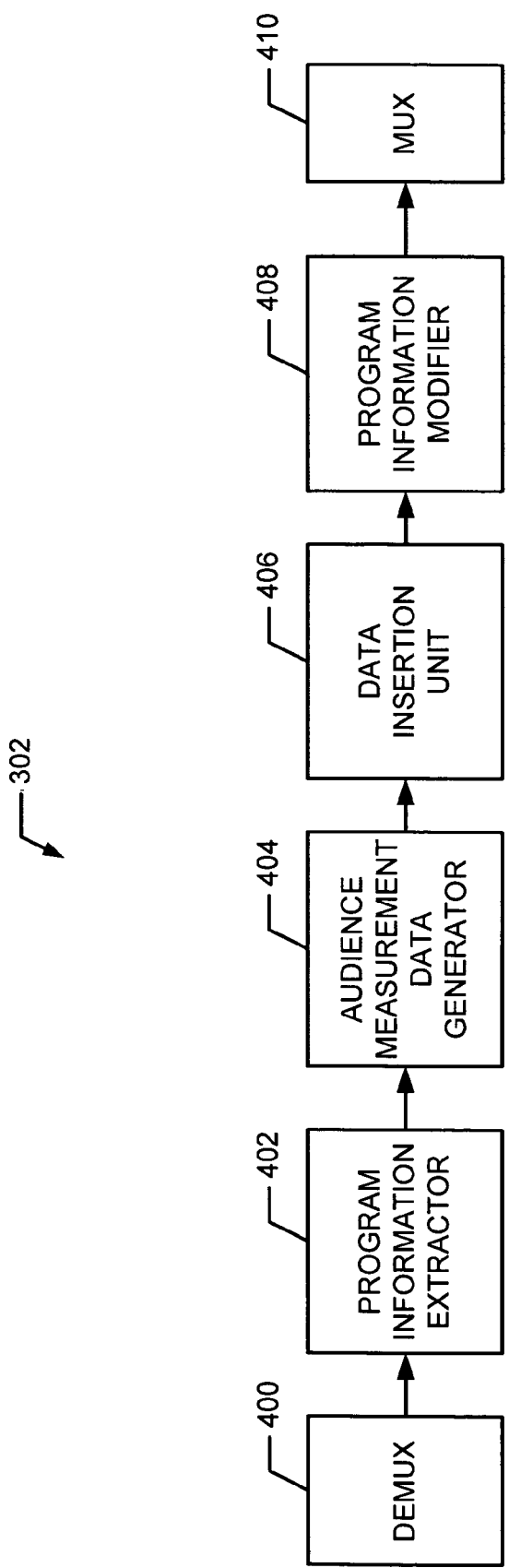
FIG. 4 is a more detailed block diagram that depicts an example manner in which the data inserter shown in FIG. 3 may be implemented.

Now turning to FIG. 4, a more detailed block diagram depicts an example manner in which the data inserter 302 shown in FIG. 3 may be implemented. The example data inserter 302 includes a demultiplexer 400 that receives a multi-program bitstream (e.g., an ATSC compliant data stream) from the multiplexer 220 (FIG. 3). The demultiplexer 400 separates the multi-program bitstream into a plurality of bitstreams, including bitstreams containing compressed data associated with individual audio/video programs, a bitstream containing PSIP information, a bitstream containing data generated by the data generator 228, etc.

A program information extractor 402 receives the individual bitstreams output by the demultiplexer 400 and extracts program information therefrom. In particular, the program information extractor 402 may extract a transport stream identifier, which uniquely corresponds to the broadcasting source (e.g., the station 102 of FIG. 1) from which the multi-program bitstream was transmitted, major and minor channel information for each of the bitstreams corresponding to an audio/video program, date and time values for each of the audio/video program bitstreams, as well as any other desired program information.

The audience measurement data generator 404 uses the extracted program information provided by the program information extractor 402 to generate audience measurement data for each of the audio/video program bitstreams contained within the multi-program bitstream received by the demultiplexer 400. The audience measurement data generator 404 may generate audience measurement data using the example syntax set forth in Table 1 below.

TABLE 1

| Data Field | Length in bits |
|---|---|
| AudienceMeasurementDataID | 8 |
| PayloadStartIndex | 4 |
| LenIndex | 4 |
| Payload | Variable |

The data field AudienceMeasurementDataID contains a unique identifier that may be used by decoders (e.g., the decoders 116, 118, 120, and 130) to identify audience measurement data and/or the audience measurement entity (e.g., a company) that has inserted the data. Such unique identifiers may be known in advance to facilitate the identification process. The data field PayloadStartIndex holds a value indicating the order in which audience measurement information is stored in the payload. One example manner in which the values of PayloadStartIndex may correspond to payload data organization is set forth in Table 2 below.

TABLE 2

| PayloadStartIndex | Payload Data Starts With |
|---|---|
| 0 | TransportID [bit 15-0] |
| 1 | Major channel [bit 15-0] |
| 2 | Minor channel [bit 15-0] |
| 3 | Time [bit 31-16] |
| 4 | Time [bit 15-0] |

The data field LenIndex holds a value that indicates the length of the data field Payload. One example manner in which the data field LenIndex may define the length of the data field Payload in set forth in Table 3 below.

TABLE 3

| LenIndex | Payload Length in Bytes |
|---|---|
| 0 | 2 |
| 1 | 4 |
| 2 | 6 |
| 3 | 8 |
| 4 | 10 |

Using the above example data field semantics set forth in Tables 1 through 3, if PayloadStartIndex=3 and LenIndex=3, then the payload contains eight bytes in the order set forth in Table 4 below. Thus, the LenIndex data field enables modulation of the length of the inserted audience measurement data as a function of the number of bytes available in the inserted data location or placeholder.

TABLE 4

| Payload Data | No. of Bytes |
|---|---|
| Time [bit 31-16] | 2 |
| Time [bit 15-0] | 2 |
| Transport ID [bit 15-0] | 2 |
| Major Channel [bit 15-0] | 2 |

Of course, Tables 1 through 4 above are merely one example manner in which the audience measurement data generator 404 may generate audience measurement data. Other data types and formats may be used to form audience measurement data for any desired application. For example, the Transport ID may be replaced by a proprietary identifier that is used by, for example, an audience measurement entity (e.g., a company) to identify a channel with a particular major/minor channel number. Alternatively, the Transport ID may be replaced with a public content identifier such as, for example, an AD-ID or V-ISAN, which are well known content identification schemes.

A data insertion unit 406 inserts the audience measurement data provided by the audience measurement data generator 404 in the individual bitstreams, which correspond to the individual audio/video programs provided by the demultiplexer 400. More specifically, the data insertion unit 406 packs or time shifts compressed data packets within the data frames of each audio/video program bitstream to expand a predetermined portion or data area of one or more data frames within those compressed data bitstreams. Audience measurement data pertaining to each of those audio/video bitstreams is inserted into one or more of the expanded predetermined portions or data areas.

In addition to receiving audience measurement data to insert, the data insertion unit 406 may also receive other data such as, for example, non-audience measurement data to insert from the data generator 304 (FIG. 3). As described above, such non-audience measurement data may include interactive data such, for example URLs, applets, scripts, etc. Example syntax for such non-audience measurement data is set forth below in Tables 5 and 6.

TABLE 4

| Data Field | Value/Length |
|---|---|
| Interactive Data Identifier | 0xBB H |
| Data Length | XX bytes |
| Data Type | YY |
| Data | ZZ |

TABLE 5

| Data Type Value | Data Type Description |
|---|---|
| 0 | URL |
| 1 | Scripts |
| 2 | Applets |

Audio/video bitstreams having data inserted therein by the data insertion unit 406 are provided to the program information modifier 408, which may, if needed, modify the program information associated with one or more of those bitstreams. In some cases, depending on where in the bitstream the data insertion unit 406 inserts the audience measurement data or other data, the program information associated with the bitstream into which the data has been inserted may have to be updated. For example, in the case where the program information includes PSIP and/or PSI table information, it may be necessary to modify the information the PSIP and/or PSI table information to reflect changes to reflect that private data has been inserted in the bitstream.

After being processed by the program information modifier 408, a multiplexer 410 receives the individual bitstreams, including audio/video bitstreams into which audience measurement data and/or other data has been inserted by the data insertion unit 406. The multiplexer 410 also receives program information, which may have been modified via the program information modifier 408. For example, the multiplexer 410 may receive bitstreams containing modified PSIP information. Still other bitstreams may be received by the multiplexer 410 such as, for example, a bitstream containing other programs or data. In any event, the multiplexer 410 multiplexes the plurality of bitstreams that it receives into a single multi-program bitstream or transport stream that may have substantially the same format (e.g., that is compliant with the same protocol) as the transport stream received by the demultiplexer 400. However, the multi-program bitstream or transport stream output by the multiplexer 410 contains data inserted by the data insertion unit 406 and may contain program information modified by the program information modifier 408.

Figure 5:
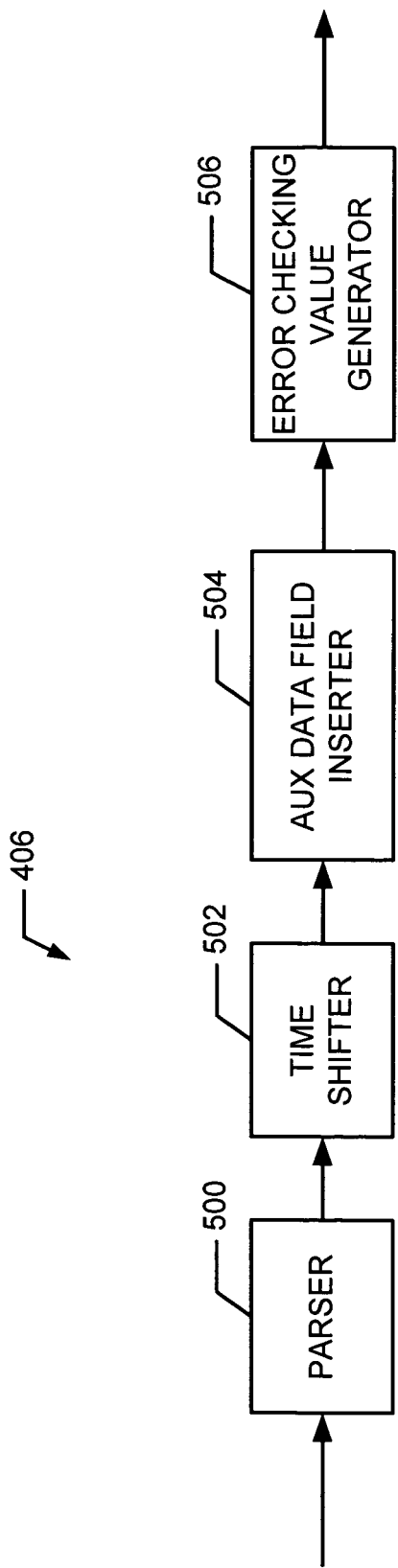
FIG. 5 is a more detailed block diagram depicting an example manner in which the data insertion unit of FIG. 4 may be implemented.

FIG. 5 is a more detailed block diagram depicting an example manner in which the data insertion unit 406 may be implemented. The data insertion unit 406 may include a parser 500 that parses out or extracts a particular type or types of data packets to be passed to a time shifter 502. In one example, where data insertion unit 406 is implemented within the digital broadcast station 102 of FIG. 1 and where the digital broadcast station 102 is configured to transmit ATSC compliant digital television signals, the parser 500 is configured to extract compressed audio data packets compliant with the AC-3 standard. In that example, the time shifter 502 is configured to time shift the compressed audio data packets within AC-3 data frames to reduce the number of or to eliminate skip bytes within the AC-3 data frames.

As is well known, compressed audio bitstreams compliant with the AC-3 standard typically include frames having one or more skip bytes, which are formed during the encoding process to maintain a fixed frame size for each AC-3 frame and which typically do not contain any useful information. In addition, AC-3 data frames contain an auxiliary data field, which may be used to transmit information other than compressed audio data and/or may be used to fine tune the number of bits contained in a frame. However, in practice, the auxiliary data fields within AC-3 frames typically include few, if any, bytes.

As noted above, the time shifter 502 reduces the number of or eliminates skip bytes within AC-3 frames and shifts audio data within the AC-3 frames to occupy the eliminated skip bytes. The result of the shifting is a packing of the compressed audio data toward one end of the frames to occupy portions of the frames previously occupied by skip bytes, which effectively temporally shifts the audio data. Another result of this shifting is an increase in the number of bits available for the auxiliary data fields.

An auxiliary data field inserter 504 inserts the audience measurement data generated by the audience measurement data generator 404 into the newly expanded auxiliary data fields of the AC-3 frames. The inserted audience measurement data may be formatted as described above in connection with Tables 1 through 4 above, or in any other desired manner. Alternatively or additionally, non-audience measurement data provided by the data generator 304 (FIG. 3) may be inserted in the auxiliary data fields of the AC-3 frames by the auxiliary data field inserter 504.

After the audience measurement data and/or other data has been inserted in the newly expanded auxiliary data field of the AC-3 frames, an error checking value generator 506 generates new error checking values for each AC-3 frame. In this example, the error checking value generator 506 is configured to re-compute the cyclical redundancy check (CRC) values, which represent within each AC-3 frame. Re-computation of the CRC values for the AC-3 frames is necessary because elimination of skip bytes, shifting compressed audio data and inserting data in the AC-3 frame auxiliary data fields renders the original CRC values meaningless (i.e., the original CRCs are no longer representative of the data contained in the frames).

In general, the example data inserter 302 (FIG. 3) and data generator 304 (FIG. 3) may be implemented using primarily hardware, primarily software or any desired combination of hardware and software. In the case of a primarily software-based implementation, a computer system or other processor system that executes machine readable instructions or programs may be used to implement the apparatus and methods described herein. The machine readable instructions or programs may be embodied in software stored on a tangible medium such as a CD-ROM, a floppy disk, a hard drive, a digital versatile disk (DVD), or a memory.

Figure 6:
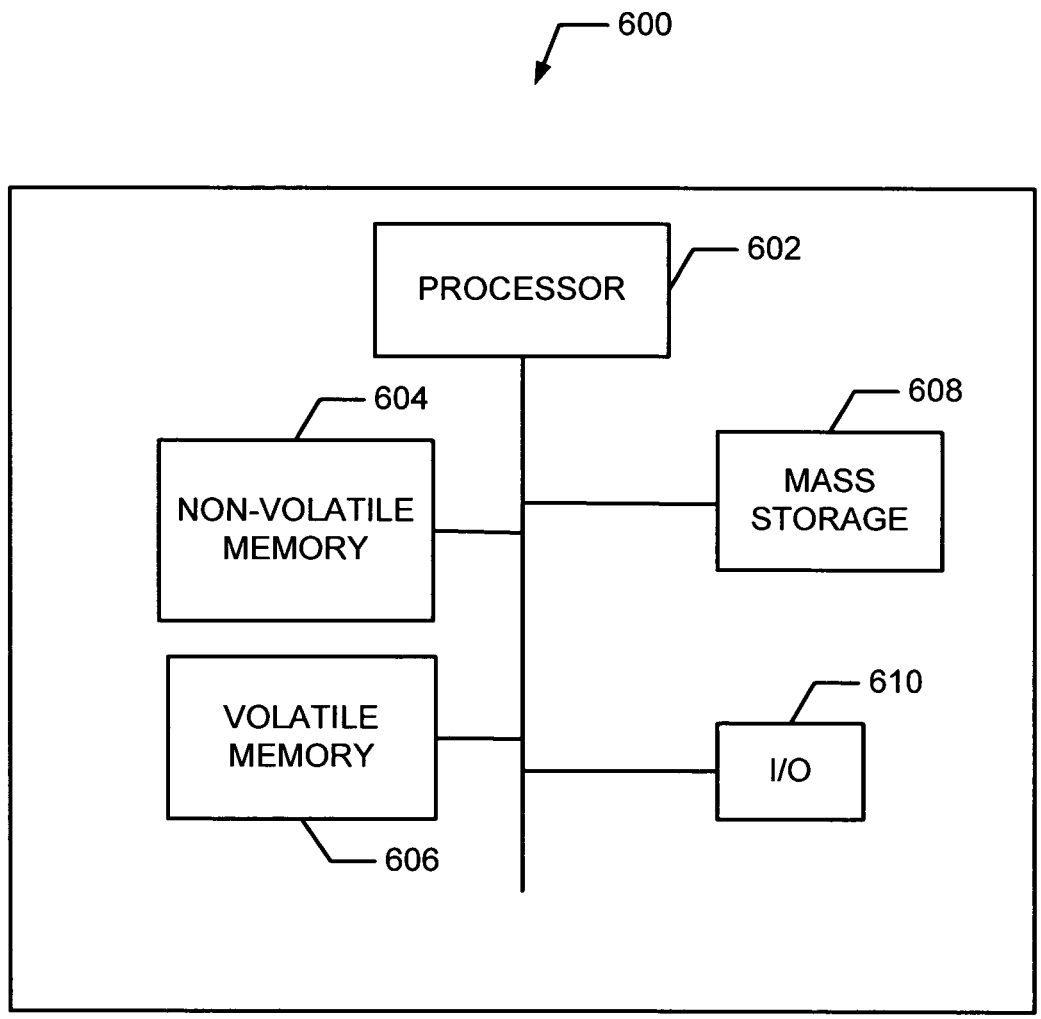
FIG. 6 is a block diagram of an example processor-based system that executes software or instructions stored on a machine readable medium to implement the example data inserter shown in FIG. 3.

FIG. 6 is a block diagram of an example processor-based system 600 that executes software or instructions stored on a machine readable medium to implement the example data inserter 302 (FIG. 3) and/or the example data generator 304 (FIG. 3). The example processor-based system 600 includes a processor 602, which may be any suitable microprocessor such as, for example, a processor from the Intel Pentium® family of microprocessors. The processor 602 is communicatively coupled to a non-volatile memory 604 and a volatile memory 606. The non-volatile memory 604 may be implemented using, for example, electrically erasable programmable read only memory (EEPROM), read only memory (ROM), etc. The volatile memory 606 may be implemented using, for example, static random access memory (SRAM), dynamic random access memory (DRAM), etc. The processor 602 is also coupled to a mass storage device 608, which may be implemented using, for example, a disk drive that stores digital information using a magnetic or optical media.

The processor 602 retrieves and executes machine readable instructions or software programs that are stored on one or more of the memories 604 and 606 and/or the mass storage device 608 to perform the functions of the data inserter 302 and/or data generator 304 shown in FIG. 3.

The processor 602 is also in communication with an input/output (I/O) unit 610, that enables the system 600 to communicate with, for example, the user interface 308 (FIG. 3). The I/O unit 610 may include circuitry for performing network communication functions (e.g., Ethernet communication functions), phone line communication functions (e.g., modem functions), peripheral device communication functions (e.g., universal serial bus communications, parallel port communications, etc.) to enable the system 600 to communicate with one or more input devices such as, for example, a mouse, keyboard, etc. and/or one or more output devices such as, for example, a video display, a printer, etc.

Figure 7:
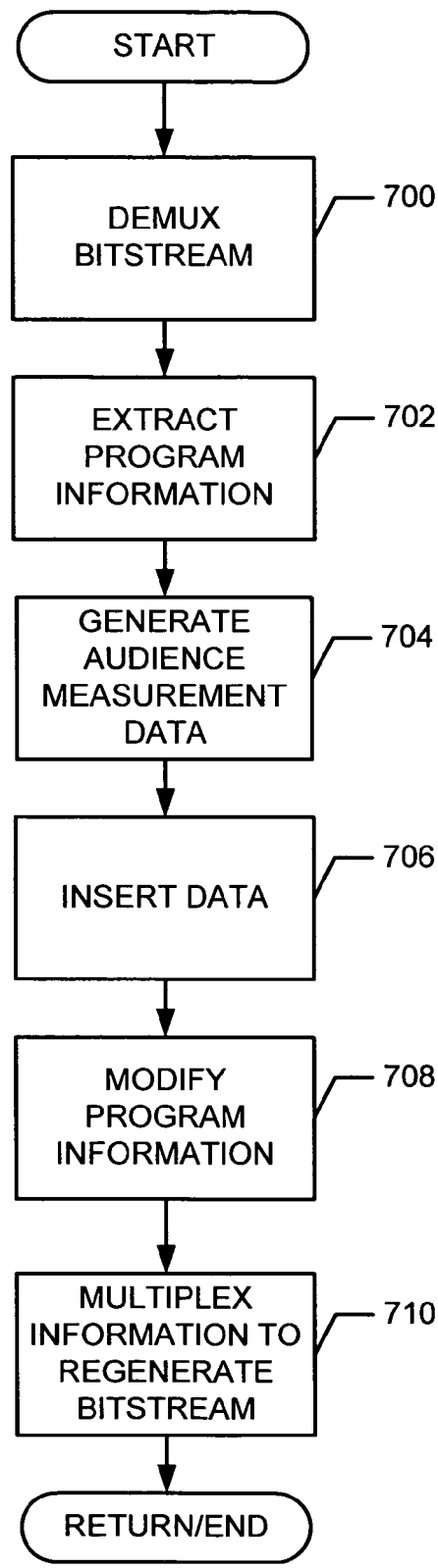
FIG. 7 is a flow diagram of an example manner in which the processor system shown in FIG. 6 may be configured to perform the functions of the example data inserter shown in FIG. 3.

FIG. 7 is a flow diagram of an example manner in which the processor system 600 shown in FIG. 6 may be configured to perform the functions of the data inserter 302 shown in FIG. 3. Initially, the multi-program bitstream or transport stream received from the multiplexer 220 (FIG. 3) is demultiplexed into its constituent bitstreams (block 700). In particular, the transport stream may be separated into a plurality of audio/video program bitstreams, a bitstream containing PSIP information, as well as other bitstreams containing other data and/or program information. Program information such as, for example, transport stream identifiers, major and minor channel numbers, date and time value, etc. are then extracted from the constituent bitstreams (block 702). The extracted program information is then used to generate audience measurement data (block 704), which is subsequently inserted in predetermined portions or data fields within the audio/video bitstreams (block 706). The program information may then be modified, if necessary, (block 708) and the constituent bitstreams, some of which have been modified via insertion of audience measurement data and/or modification of program information, are multiplexed to form a single transport stream (block 710).

Figure 8:
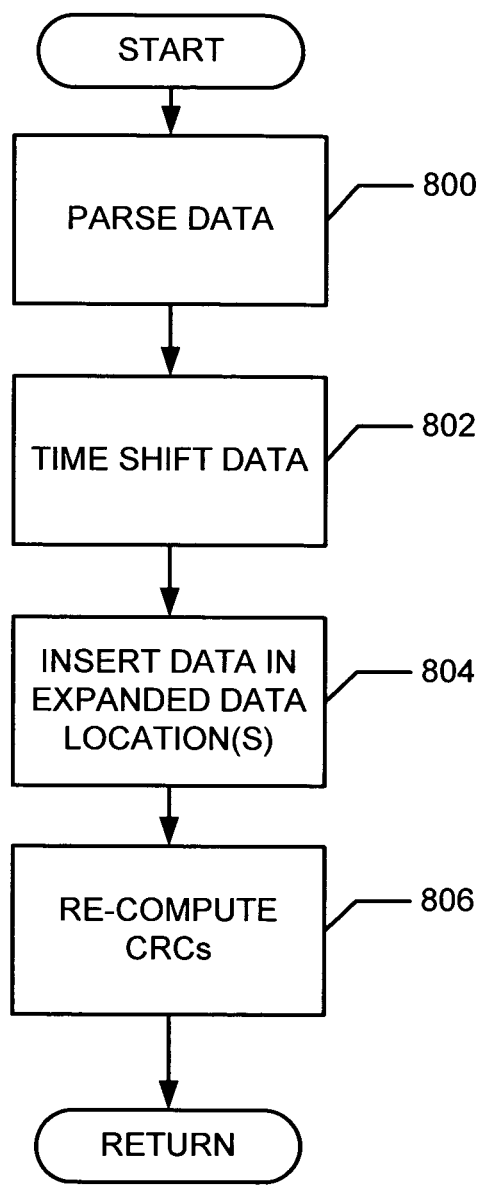
FIG. 8 is a more detailed flow diagram of an example manner in which the data insertion block of FIG. 7 may be implemented.

FIG. 8 is a more detailed flow diagram of an example manner in which the data insertion block 706 of FIG. 7 may be implemented. In particular, the audio/video bitstreams are parsed to extract certain data packets into which data will be inserted. In one example, as described above, audio data packets compliant with the AC-3 standard are extracted. The audio data within the AC-3 data frames is time shifted to eliminate skip bytes within the frames (block 802), thereby increasing the number of bits available to the auxiliary data field within one or more of the data frames. Audience measurement data, as well as other data, may then be inserted in the newly expanded auxiliary data field (block 804). The CRC for each AC-3 frame is then re-computed (block 806).

Figure 9:
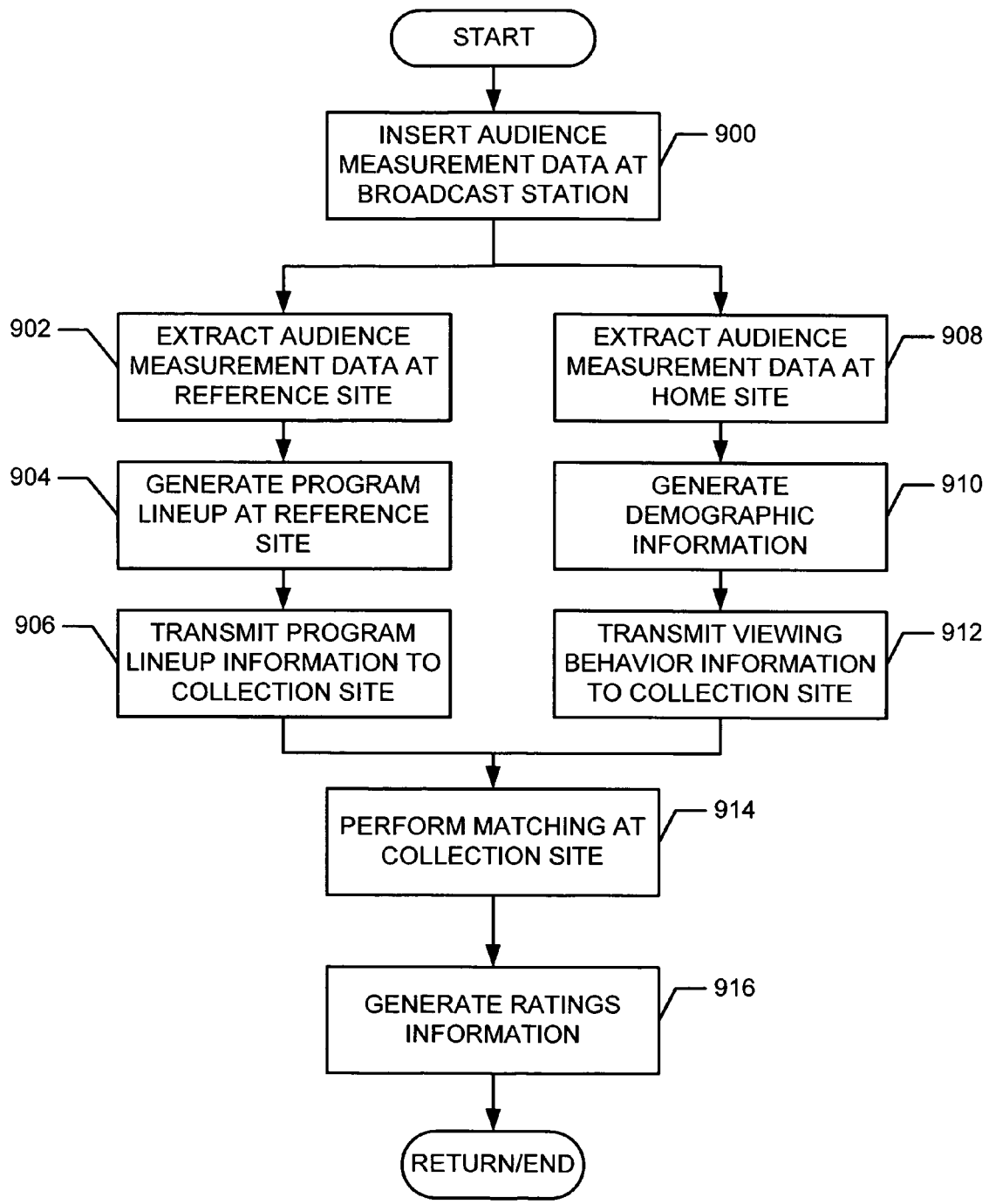
FIG. 9 is a flow diagram of an example method by which the system shown in FIG. 11 may generate viewing behavior and ratings information using data inserted by the example data inserter of FIG. 3.

FIG. 9 is a flow diagram of an example method by which the system 100 shown in FIG. 1 may generate viewing behavior and ratings information using data inserted by the data inserter 302 of FIG. 3. Initially, the digital broadcast station 102 (FIG. 1) inserts audience measurement data into its broadcast transport stream using, for example, the data inserter apparatus and methods described herein (block 900). One or more of the decoders 116, 118 and 120 (FIG. 1) together with the reference site processor 122 (FIG. 1) extract the audience measurement data from known locations within the transmitted bitstreams (block 902). For example, in the case where the data inserted within the compressed audio bitstreams compliant with the AC-3, the known locations may be the auxiliary data fields of the AC-3 frames as described above. The reference site processor 122 (FIG. 1) uses the extracted audience measurement data to generate a program lineup (block 904). In particular, because the reference site 108 (FIG. 1) can use its multiple decoders 116, 118 and 120 to receive and process multiple audio/video bitstreams simultaneously, the reference site processor 122 (FIG. 1) can simultaneously detect and identify, using the inserted audience measurement data, a plurality of broadcast programs available for consumption. The reference site 122 (FIG. 1) may then transmit the generated program lineup information to the collection site (block 906), which in this case is the central processing facility 124 (FIG. 1).

At the consumption site 110 (FIG. 1), the site unit 132 is configured to extract the inserted audience measurement data from the signal 136 (block 908), which, in one example, is an S/PDIF signal containing compressed audio data compliant with the AC-3 standard. In that case, the inserted audience measurement data is located in the auxiliary data fields of the AC-3 data frames and the site unit 132 (FIG. 1) is configured to identify the auxiliary data fields and to extract information therefrom. The site unit 132 (FIG. 1) is also coupled to a people meter and/or other devices that enable the site unit 132 (FIG. 1) to generate demographic information (block 910). For example, the site unit 132 (FIG. 1) may be configured to detect the identities of the person or persons currently consuming an audio/video program via the output unit 128. In any event, the site unit 132 (FIG. 1) transmits the viewing behavior information (i.e., the audience measurement data, demographic information, etc.) to the collection site (block 912) (i.e., the central processing facility 124 (FIG. 1)).

The collection site or central processing facility 124 (FIG. 1) then compares the viewing behavior information received from the consumption site 110 (FIG. 1) to the program lineup information received from the reference site 108 (FIG. 1) (block 914). By matching the viewing behavior information to portions of the program lineup information, the collection site or central processing facility 124 (FIG. 1) may determine the time and manner in which audio/video programs were consumed at the consumption site 110 (FIG. 1) and/or other consumption sites (not shown) and by whom those audio/video programs were consumed. The matching information generated at block 914 may then be used by the central processing facility 124 (FIG. 1) to generate ratings information (block 916).

In cases where the data generator 304 (FIG. 3) has provided non-audience measurement data (e.g., interactive data) to the data inserter 302 (FIG. 3), the decoder 130 (FIG. 3) and/or site unit 132 (FIG. 3) may extract from the auxiliary data fields of the AC-3 frames and process that non-audience measurement data. For example, the site unit 132 (FIG. 1) may include or be coupled to a web server (not shown) that enables activation of URLs and/or other interactive data. In some cases, the non-audience measurement data may be appropriately transcoded and conveyed via one or more wireless communication links to a portable devices such as, for example, a cellular phone, personal data assistant and/or a computer.

Figure 10:
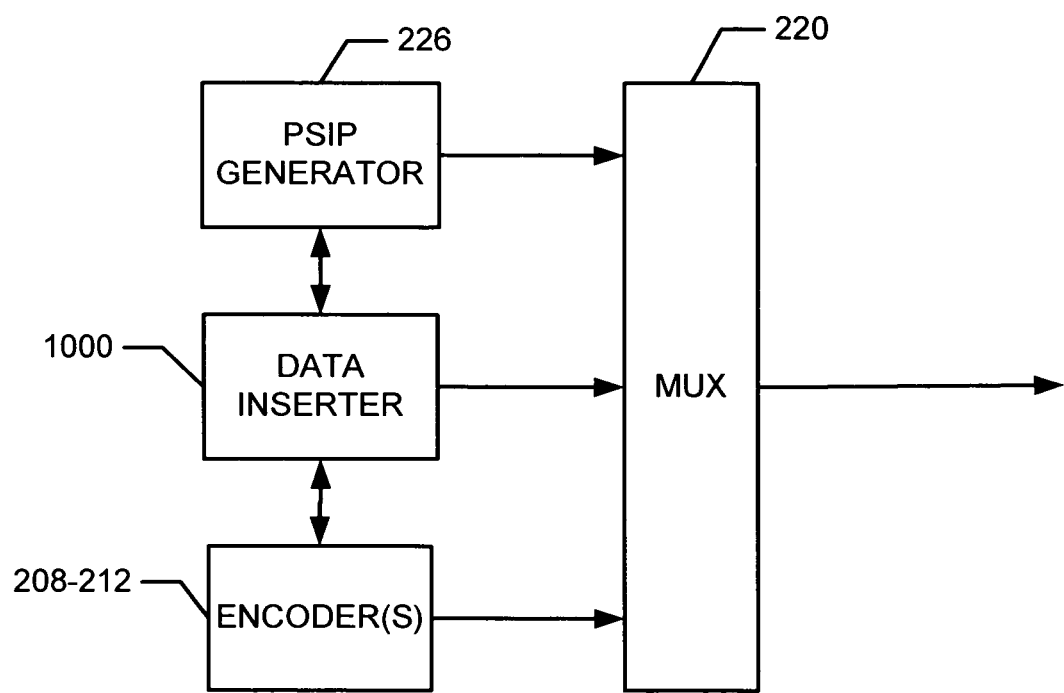
FIG. 10 is a block diagram of another manner in which a data inserter may be configured to insert audience measurement data in a compressed audio/video content or program bitstream.

Although the example data inserter 302 is depicted in FIG. 3 as being serially interposed between the multiplexer 220 and the modulator 222, other configurations may be used instead to achieve results identical or similar to those described above. FIG. 10 is a block diagram of another manner in which a data inserter 1000 may be configured to insert audience measurement data in a compressed audio/video content or program bitstream. As depicted in FIG. 10, the data inserter 1000 is communicatively coupled to the PSIP generator 226, one or more of the encoders 208, 210 and 212 and the multiplexer 220. In this configuration, the data inserter 1000 does not require a demultiplexer (e.g., the demultiplexer 400 of FIG. 4) or a multiplexer (e.g. the multiplexer 410 of FIG. 4). Still other configurations are possible. For example, the data inserter 1000 may be integrated with the PSIP generator 226 and/or one of more of the encoders 208-212.

While the data insertion apparatus and methods described herein have been described with reference to specific examples, the apparatus and methods may be implemented in different manners to achieve identical or similar results. More specifically, although example methods and apparatus may time shift compressed audio data within AC-C compliant data frames to expand the number of bits available for AC-3 frame auxiliary data fields, into which data may be inserted, other insertion techniques may be used instead. For example, audience measurement data and/or other data may be inserted in private descriptors such as, for example, the ATSC private descriptor, the MPEG-2 metadata descriptor and/or the MPEG-2 private descriptor in Program System Information (PSI) tables (e.g., the program loop that is present in a program map table (PMT) section). Alternatively or additionally, the audience measurement data and/or other data may be inserted in Event Information Tables (EITs), A-90 data packets and/or null or padding packets to achieve identical or similar results.

Although certain methods, apparatus and articles of manufacture have been described herein, the scope of coverage of this patent is not limited thereto. To the contrary, this patent covers all embodiments including apparatus, methods and articles of manufacture fairly falling within the scope of the appended claims either literally or under the doctrine of equivalents.

What is claimed is:

1. A method of inserting data in a compressed data bitstream, comprising:
   generating audience measurement data from program information that was extracted from a compressed data bitstream;
   generating interactive data;
   increasing a size of an auxiliary data field of a data frame of the compressed data bitstream by:
   extracting compressed audio data within the data frame;
   moving the compressed audio data to occupy a data location in the data frame from which a skip byte was eliminated; and
   packing the compressed audio data toward one end of the data frame; and
   inserting the audience measurement data or the interactive data in the auxiliary data field to form a modified compressed data bitstream.

2. A method as defined in claim 1, further comprising demultiplexing the compressed data bitstream to identify a plurality of programs.

3. A method as defined in claim 1, wherein the compressed data bitstream is compliant with an AC-3 format.

4. A method as defined in claim 1, further comprising re-computing an error checking value associated with the compressed data bitstream after inserting the audience measurement data or the interactive data in the auxiliary data field.

5. A method as defined in claim 4, wherein the error checking value is a cyclical redundancy check value.

6. A method as defined in claim 1, further comprising broadcasting the modified compressed data bitstream.

7. A method as defined in claim 1 further comprising: modifying the program information.

8. A method as defined in claim 1, further comprising modifying the program information to update scheduling, program guides or transport stream identifiers.

9. A method as defined in claim 1 further comprising using a multiplexer to form the compressed data bitstream as a multi-program bitstream from a plurality of data bitstreams.

10. A method as defined in claim 9, wherein the inserting of the data occurs after the using of the multiplexer via a single data inserter.

11. A method as defined in claim 1, wherein the compressed data bitstream includes audio and video content.

12. A method as defined in claim 1, further comprising:
    generating broadcast information with a Program and System Information Protocol (PSIP) generator;
    accessing the broadcast information generated by the PSIP generator; and
    correlating the audience measurement data with the broadcast information.

13. A method as defined in claim 1, further comprising modifying the program information to reflect that private data has been inserted in the data bitstream.

14. A method as defined in claim 1, wherein both the audience measurement data and the interactive data are inserted into the bitstream.

15. A system for inserting data in a compressed data bitstream, comprising:
a memory; and
a processor coupled to the memory and programmed to:
generate audience measurement data from program information extracted from the compressed data bitstream;
generate interactive data;
increase a size of an auxiliary data field of a data frame of the compressed data bitstream by:
extracting compressed audio data within the data frame;
moving the compressed audio data to occupy a data location in the data frame from which a skip byte was eliminated; and
packing the compressed audio data toward one end of the data frame; and
insert the audience measurement data or the interactive data in the auxiliary data field to form a modified compressed data bitstream.

16. A system as defined in claim 15, wherein the processor is programmed to demultiplex the compressed data bitstream to identify a plurality of programs.

17. A system as defined in claim 15, wherein the compressed data bitstream is compliant with an AC-3 format.

18. A system as defined in claim 15, wherein the processor is programmed to re-compute an error checking value associated with the compressed data bitstream after inserting the audience measurement data or the interactive data in the auxiliary data field.

19. A system as defined in claim 18, wherein the error checking value is a cyclical redundancy check value.

20. A machine readable device or storage disk having instructions stored thereon that, when executed, cause a machine to at least:
generate audience measurement data from program information extracted from a compressed data bitstream;
generate interactive data;
increase a size of an auxiliary data field of a data frame of the compressed data bitstream by:
extracting compressed audio data within the data frame;
moving the compressed audio data to occupy a data location in the data frame from which a skip byte was eliminated; and
packing the compressed audio data toward one end of the data frame; and
insert the audience measurement data or the interactive data in the auxiliary data field to form a modified compressed data bitstream.

21. A machine readable device or storage disk as defined in claim 20 having instructions stored thereon that, when executed, cause the machine to demultiplex the compressed data bitstream to identify a plurality of programs.

22. A machine readable device or storage disk as defined in claim 20, wherein the compressed data bitstream is compliant with an AC-3 format.

23. A machine readable device or storage disk as defined in claim 20 having instructions stored thereon that, when executed, cause the machine to re-compute an error checking value associated with the compressed data bitstream after inserting the audience measurement data or the interactive data in the auxiliary data field.

24. A machine readable device or storage disk as defined in claim 23, wherein the error checking value is a cyclical redundancy check value.

25. A digital broadcast station, comprising:
a multiplexer;
an encoder coupled to the multiplexer; and
a data inserter coupled to the multiplexer, wherein the data inserter comprises:
a program information extractor to extract program information from a compressed data bitstream;
an audience measurement data generator to generate audience measurement data from the extracted program information; and
an interactive data generator to generate interactive data, wherein the data inserter is to:
increase a size of an auxiliary data field of a data frame of the compressed data bitstream by:
extracting the compressed audio data within the data frame;
moving the compressed audio data to occupy a data location in the data frame from which a skip byte was eliminated; and
packing the compressed audio data toward one end of the data frame; and
insert the audience measurement data or the interactive data into an auxiliary data field of the data frame that increases in size as a result of packing the compressed audio data.

26. A digital broadcast station as defined in claim 25, wherein the encoder is configured to compression encode audio/video programs.

27. A digital broadcast station as defined in claim 26, wherein the encoder is configured to compression encode audio/video programs in accordance with a digital television broadcast standard.

28. A digital broadcast station as defined in claim 25, wherein the data inserter is configured to re-compute an error checking value within the compressed data bitstream following insertion of the audience measurement data or the interactive data into the auxiliary data field.

29. A digital broadcast station as defined in claim 25, further comprising a data generator coupled to the data inserter to generate the interactive data.

30. A digital broadcast station as defined in claim 29, further comprising a user interface coupled to the data generator.

31. A method of inserting data in a compressed data bitstream, comprising:
generating interactive data;
increasing a size of a first auxiliary data field of a first data frame of the compressed data bitstream by:
extracting compressed audio data within the first data frame;
moving the compressed audio data to occupy a data location in the first data frame from which a skip byte was eliminated; and
packing the compressed audio data toward one end of the first data frame; and
inserting the interactive data in the first auxiliary data field to form a modified compressed data bitstream.

32. A method as defined in claim 31, wherein the interactive data is one or more of a uniform resource locator, an applet or a script.

33. A method as defined in claim 31 further comprising:
generating audience measurement data from program information extracted from the compressed data bitstream;
increasing a size of a second auxiliary data field of a second data frame of the compressed data bitstream; and inserting the audience measurement data in at least one of the first auxiliary data field or the second auxiliary data field.

\* \* \* \* \*